US008001255B2

(12) United States Patent
Nesbitt et al.

(10) Patent No.: US 8,001,255 B2
(45) Date of Patent: Aug. 16, 2011

(54) SYSTEM, METHOD AND PROGRAM TO SYNCHRONIZE FILE TRANSMISSION IN A DISTRIBUTED COMPUTER SYSTEM

(75) Inventors: Richard E. Nesbitt, Holly Springs, NC (US); Brian M. O'Connell, Cary, NC (US); Herbert D. Pearthree, Cary, NC (US); Kevin E. Vaughan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1242 days.

(21) Appl. No.: 11/325,811

(22) Filed: Jan. 5, 2006

(65) Prior Publication Data

US 2007/0156896 A1    Jul. 5, 2007

(51) Int. Cl.
G06F 15/16    (2006.01)
(52) U.S. Cl. .................... 709/229; 709/203; 709/233
(58) Field of Classification Search ............. 709/232, 709/233, 225, 224, 227, 230, 238
See application file for complete search history.

(56) References Cited

U.S. PATENT DOCUMENTS

| | | | |
|---|---|---|---|
| 6,192,389 B1 * | 2/2001 | Ault et al. ............... | 718/101 |
| 6,513,068 B1 * | 1/2003 | Jones et al. ............. | 709/236 |
| 6,694,371 B1 * | 2/2004 | Sanai ..................... | 709/230 |
| 6,772,217 B1 * | 8/2004 | Baumann et al. ....... | 709/232 |
| 7,051,108 B1 * | 5/2006 | Jones et al. ............. | 709/230 |
| 7,076,568 B2 * | 7/2006 | Philbrick et al. ....... | 709/250 |
| 2002/0099844 A1 * | 7/2002 | Baumann et al. ....... | 709/232 |

(Continued)

FOREIGN PATENT DOCUMENTS

EP    1672867    * 6/2006

(Continued)

OTHER PUBLICATIONS

A novel adaptive transfer method oriented global distributed storage system Wei-Jin Jiang; Yu-Hui Xu; Yu-Sheng Xu;Machine Learning and Cybernetics, 2005. Proceedings of 2005 International Conference on Aug. 18-21, 2005 pp. 3589-3594 vol. 6; Digital Object Identifier 10.1109/ICMLC.2005.1527564.*

*Primary Examiner* — Nathan Flynn
*Assistant Examiner* — Najeeb Ansari
(74) *Attorney, Agent, or Firm* — Arthur J. Samodovitz

(57) ABSTRACT

System, method and program for transferring same files from a first computer to a plurality of second computers. Respective measures of file transfer rates from the first computer to the second computers are determined. Based on the respective measures of file transfer rates from the first computer to the second computers, determinations are made as to respective numbers of sockets within the first computer to transfer the files to the second computers to tend to equalize the time required to transfer the files from the first computer to each of the second computers. The files are transferred to each of the second computers using the determined number of sockets, wherein for each of the second computers where the number of sockets is greater than one, the files are divided between the number of sockets for transfer to the respective second computer. A greater number of sockets are used for those of the second computers for which the first computer has slower file transfer rates than for those of the second computers for which the first computer has greater file transfer rates.

21 Claims, 3 Drawing Sheets

U.S. PATENT DOCUMENTS

2002/0199000 A1* 12/2002 Banerjee .................. 709/227
2003/0210711 A1* 11/2003 Faust et al. ................ 370/474
2004/0015561 A1* 1/2004 Mayhew et al. ........... 709/217
2004/0177152 A1 9/2004 Aviran ...................... 709/235
2004/0239985 A1* 12/2004 Benz et al. ................ 358/1.15
2005/0044250 A1* 2/2005 Gay et al. .................. 709/230
2006/0020598 A1* 1/2006 Shoolman et al. ............ 707/8
2006/0059244 A1* 3/2006 Melman .................... 709/217
2007/0067488 A1* 3/2007 McIntire et al. ........... 709/238

FOREIGN PATENT DOCUMENTS

JP 2004013247 * 1/2004

* cited by examiner

US 8,001,255 B2

SYSTEM, METHOD AND PROGRAM TO SYNCHRONIZE FILE TRANSMISSION IN A DISTRIBUTED COMPUTER SYSTEM

FIELD OF THE INVENTION

The present invention relates generally to computer systems, and more specifically to synchronization of file transmission in a distributed computer system.

BACKGROUND OF THE INVENTION

Distributed computer systems are well known today. For example, a busy web site may employ multiple web servers such as HTTP servers to deliver files in the form of web pages or other type of files. Typically, the multiple web servers are arranged in a pool for load balancing and backup purposes, and are intended to deliver the same files to clients upon their request. In addition, web sites requiring high availability may employ multiple physical locations to guard against failures such as network backbone outages, prolonged power outages, fires, etc. Ideally, the web servers deliver the same files at all times, even when the files are updated, so that all clients receive the same content when making requests at the same time. There are known techniques to enable the web servers to deliver the same content.

One known technique is to provide a single, shared repository for the files, and each web server fetches and delivers the files from this single repository. However, there are problems with this technique—low reliability due to reliance on a single repository, low scalability due to the limited bandwidth and finite response time of a single repository.

Another known technique is for each web server to have its own storage for the files. As the content of a file changes, a server furnishes the changed file to each of the storages. To ensure that each file is updated and made valid at the same time in each of the storages, a known two-phase commit procedure can be used.

An object of the present invention is to distribute new files to different storages of different web servers or other servers, and make them substantially consistent across all of the servers regardless of varying network latency between the source of the new files and the web servers.

SUMMARY OF THE INVENTION

The present invention resides in a system, method and program for transferring same files from a first computer to a plurality of second computers. Respective measures of file transfer rates from the first computer to the second computers are determined. Based on the respective measures of file transfer rates from the first computer to the second computers, determinations are made as to respective numbers of sockets within the first computer to transfer the files to the second computers to tend to equalize the time required to transfer the files from the first computer to each of the second computers. The files are transferred to each of the second computers using the determined number of sockets, wherein for each of the second computers where the number of sockets is greater than one, the files are divided between the number of sockets for transfer to said each second computer. A greater number of sockets are used for those of the second computers for which the first computer has slower file transfer rates than for those of the second computers for which the first computer has greater file transfer rates.

DETAILED DESCRIPTION OF THE PREFERRED EMBODIMENTS

Figure 1:
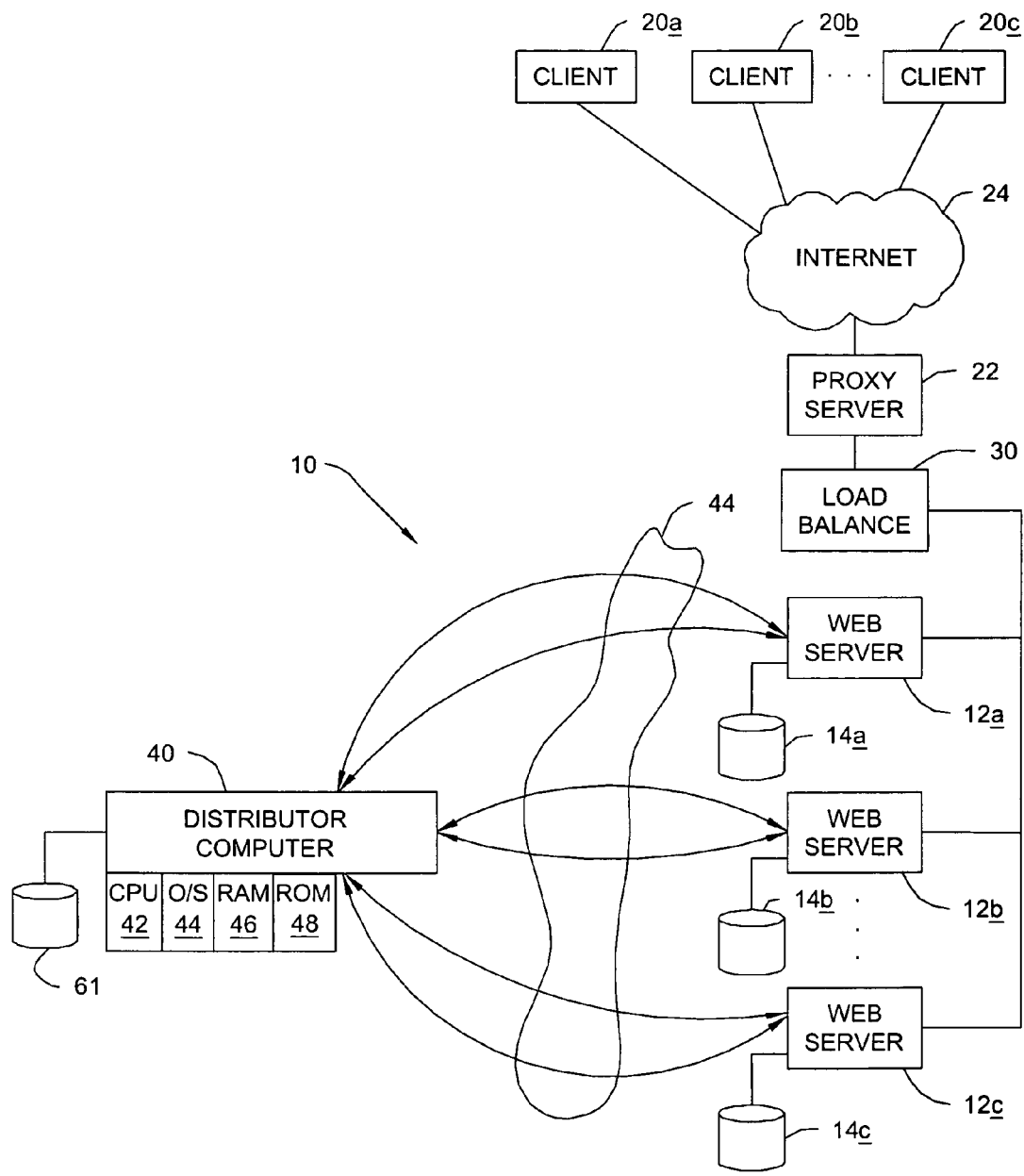
FIG. 1 is a block diagram of a distributed computer system including multiple web servers and a file distributor computer to provide new files to the web servers in a substantially consistent manner, according to the present invention.
Figure 2:
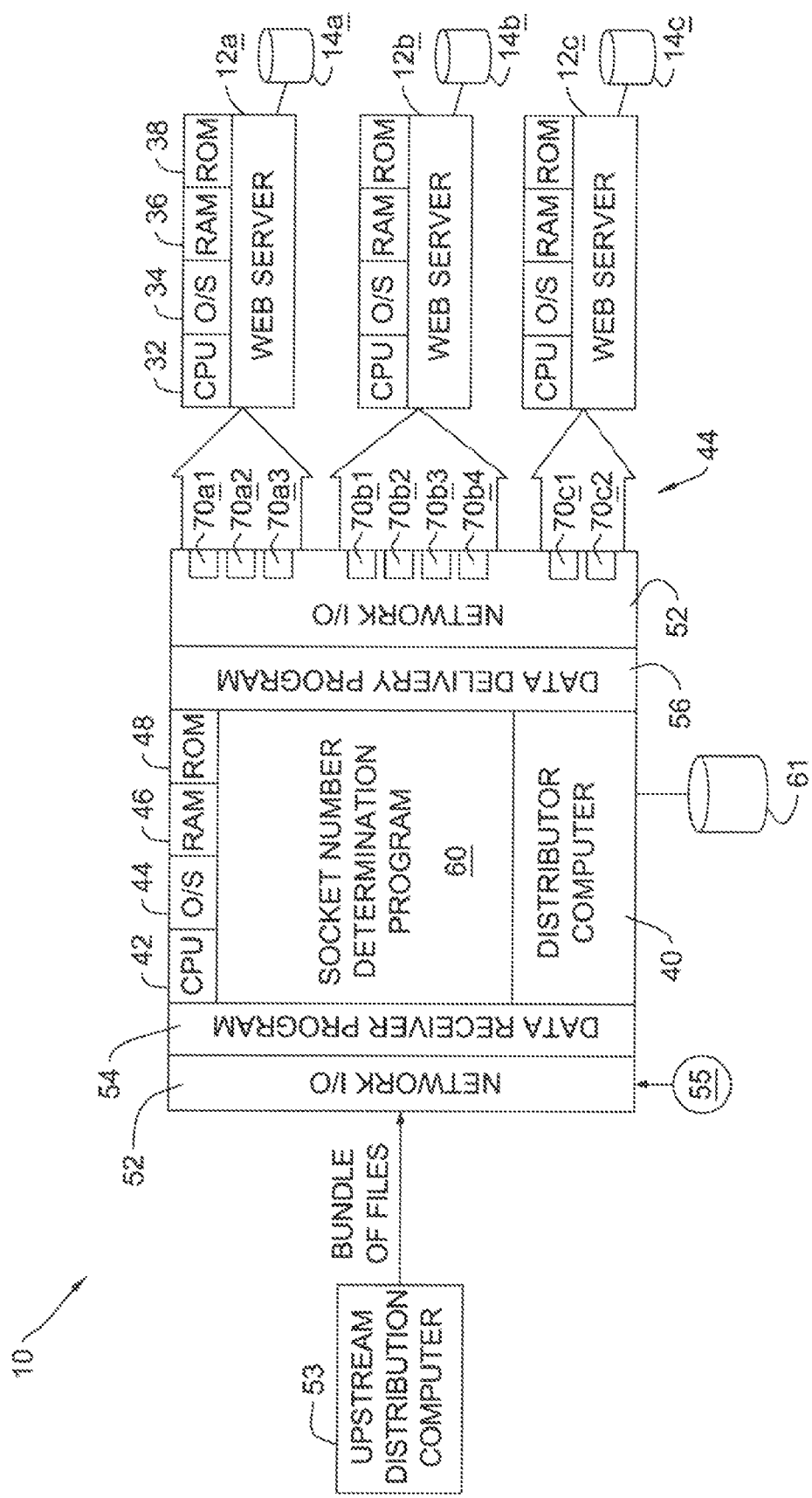
FIG. 2 is a more detailed block diagram of the file distributor computer of FIG. 1.

The present invention will now be described in detail with reference to the figures. FIG. 1 illustrates a distributed computer system generally designated 10, which includes the present invention. System 10 includes web servers 12a, b, c (although there can be many more than three), each with its own storage 14a, b, c (including a respective file manager). Each of the web servers 12a, b, c includes a CPU 32, operating system 34, RAM 36, ROM 38 and storage 14a, b or c. Web pages and other types of files are stored in storages 14a, b, c. (As used below, the term "files" includes web pages and other types of files.) As illustrated in FIG. 2, clients 20a, b . . . n (i.e. workstations with users) are coupled to a proxy server 22 via Internet 24. Clients 20a, b . . . n make requests to proxy server 22 for files in storages 14a, b, c, and proxy server 22 forwards the requests to a load balancer computer 30. By way of example, the requests can be HTTP, FTP, HTTPS, or Gopher protocol requests. In response, load balancer 30 forwards each request to one of the web servers 12a, b, c according to a known load balancing algorithm (such as round robin). The foregoing features of system 10 were known in the Prior Art.

As further illustrated in FIGS. 1 and 2, system 10 also includes a distributor computer 40. Distributor computer 40 includes a CPU 42, operating system 44, RAM 46, ROM 48 and storage 61. In accordance with the present invention, distributor computer 40 delivers new files from its storage 61 to web servers 12a, b, c (via a network 44) in a substantially consistent manner for storage in storages 14a, b, c and subsequent delivery by web servers 12a, b, c to clients 20a, b . . . n. With this substantial consistency, when clients 20a, b . . . n request the same file at the same time, they usually receive the same file. Thus, each web server 12a, b, c, at approximately the same time, makes the same files available to its clients. Network 44 can be an intranet, Internet, extranet, etc.

As further illustrated in FIG. 2, distributor computer 40 comprises a network I/O module 52 such as a TCP/IP card to interface to network 44, a data receiver program 54 to receive new files from upstream data delivery system 53, a socket number determination program 60 and a data delivery program 56. Programs 54, 56 and 60 are stored on computer readable storage media 61 for execution by CPU 42 via computer readable memory 46. An upstream data delivery system 53 can be a central repository for files, and deliver them to the distributor computer 40 when data delivery system 53 receives new files. Data delivery program 56 delivers the new files from distributor computer 40 to web servers 12a,b,c. Data delivery program 56 uses one or more sockets to deliver the new files to each of the web servers 12a,b,c. A "socket" provides inter-process communication used to form a bi-directional communication link between two computers. In accordance with the present invention, socket number determination program 60 determines the amount of time to communicate with each of the web servers 12a,b,c. For those web server(s) 12a,b,c requiring a longer time to communicate with distributor computer 40, program 60 assigns more sockets to deliver the new files than for those web server(s) 12a,b,c requiring a shorter time to communicate. This tends to equalize the transfer time for the new bundle of files. Program 60 can determine the time to communicate with each web server from past file bundle transfers to the web server by measuring the time between the transmission of the first file in a bundle to the web server and receipt of an acknowledgment for the last file in the bundle from the web server.

Typically, the upstream distributor computer 55 receives downloads of new files in groups or bundles for distribution to web servers 12a,b,c. When more than one socket is used to transfer the new file to the web server, the data delivery program 56 divides the new files between different sockets such that different files in the bundle are transmitted via different sockets. Data delivery program 56 attempts to evenly distribute the new files in the bundle (based on their respective lengths) between the different sockets assigned for the transmission to the web server. In the example of FIG. 2, three sockets 70a1-a3 are used to transfer the new files to web server 12a, four sockets 70b1-b-4 are used to transfer the new files to web server 12b, and two sockets 70c1-c2 are used to transfer the new files to web server 12c.

Figure 3:
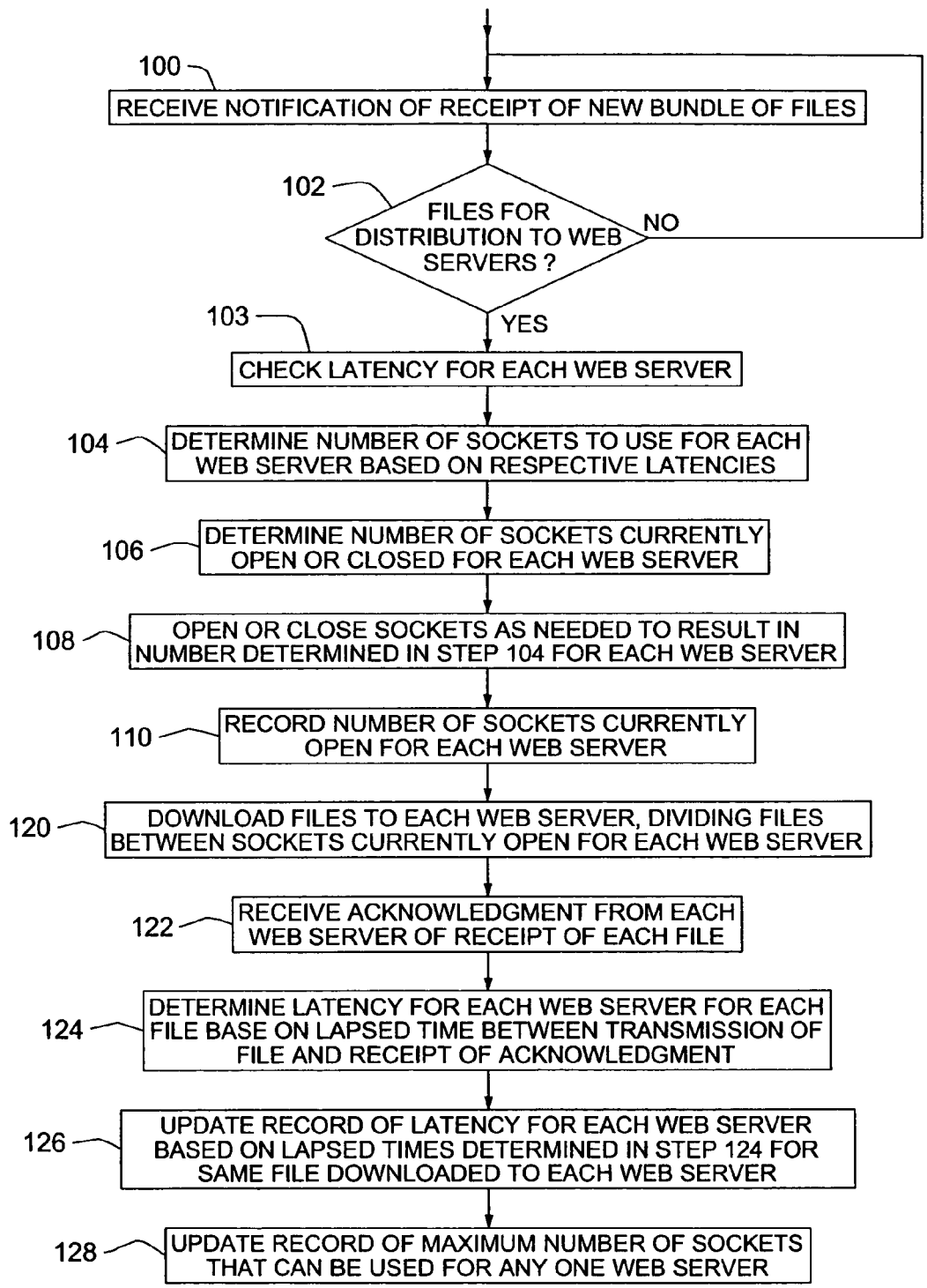
FIG. 3 is a flow chart of a socket number determination program within the file distributor computer of FIG. 1.

FIG. 3 illustrates the socket number determination program 60 in more detail. In step 100, data receiver program 54 notifies program 60 that distributor computer 60 has received a bundle of new files. If the notification is to distribute the new files to web servers 12a, b, c (decision 102, yes branch), then program 60 checks the Average Bundle Transmission Time ("ABTT"), i.e. the amount of time to transmit each bundle to the web servers 12a, b, c during the previous tranmission of a file bundle to the web servers 12a, b, c (step 103). The ABTT is a sliding window average, meaning only the last N number of bundle transmit times are included in the average. Program 60 determined and recorded these amounts of time from previous file bundle transfers as described below. Next, program 60 determines the number of sockets to use for each of the web servers 12a, b, c to best equalize the total time to transmit the bundle of new files to web servers 12a, b, c (step 104). For example, the ABTT to web server 12a is 300 milliseconds, the latency to web server 12b is 400 milliseconds and the ABTT to web server 12c is 200 milliseconds (for transmission of the same file). In such a case, program 60 will assign and use three sockets to transfer the bundle of new files to web server 12a, four sockets to transfer the new file to web server 12b and two sockets to transfer the new file to web server 12c. In general, program 60 assigns more sockets for transmission to a web server with longer ABTT than to another web server with shorter ABTT. The goal of program 60 is to best equalize the transfer time of the bundle of new files to each web server, based on the number of sockets which are used for each web server. Distributor computer 40 can have many sockets available for transmission of the bundle of new files to the web servers 12a, b, c, in some cases, hundreds of sockets. Program 60 uses the following algorithm to determine the number of sockets to use for each web server to transmit the bundle of new files:

1. For all servers, determine the lowest current Average Bundle Transmission Time (ABTT).
2. For all servers, set the current number of sockets (numberOfSockets) equal to the number of sockets from the previous bundle transmission. If no bundles have been transmitted use an initial socket number.
3. For each server except the server will the lowest current ABTT, calculate the number of sockets to use via the following formula for web server$_{ws}$ where $_s$ is the smallest ABTT for any of the webservers:

$$numberOfSockets = (ABTT_{ws}/ABTT_s) * numberOfSockets$$

4. Convert numberOfSockets to an integer truncating any remainder from the previous operation.
5. Calculate the maxSocket value for each server by choosing the minimum of two values: The system wide fixed maximum socket value and the value set in step 128 if available.
6. numberOfSockets is equal to the minimum of the calculated numberOfSockets value and the calculated maxSocket value.

After determining the number of sockets to assign to each web server 12a, b, c, program 60 checks how many, if any, are currently "open" for each web server 12a, b, c (step 106). (Some of the sockets may still be open from a previous connection.) Next, for each web server 12a, b, c, program 60 opens or closes sockets, as needed, such that the total number of sockets currently open for the web server equals the number determined in step 104 for that web server (step 108). For example, if there is currently one socket open for web server 12a, and a total of four are needed for the current transmission, then program 60 will open three additional sockets to web server 12a. As another example, if there are not any sockets currently open for web server 12b, and a total of three are needed, then program 60 will open three sockets for web server 12b. Next, program 60 records the number of sockets open for each of the web servers 12a, b, c (step 110). Next, program 60 transmits the bundle of new files to each web server 12a, b, c (step 120) reusing opened sockets after each file is transferred. (In another embodiment of the present invention, it is possible to take the entire bundle of files, split the bundle into buckets, regardless of file boundaries and transmit each bucket over a separate socket. The receiving site will then reassemble the buckets into the respective files that comprised that bundle.)

When each new file is transmitted to each of the web servers 12a, b, c, the web server responds to distributor computer 40 with an acknowledgment (step 122). Program 60 then computes the bundle transmission time for each web server (for this same file) based on the lapsed time from when distributor computer 40 began the transmission of the first file in the bundle until it received the acknowledgment for that last file in the bundle (step 124). Next, program 60 updates its record of the respective latencies for web servers 12a, b, c (step 126).

In the preferred embodiment, program 60 abides by a predetermined upper limit in the number of sockets that can be used for any one web server. Program 60 can also adjust the upper limit based on previous transmissions in which adding additional sockets did not increase overall throughput (step 128). By way of example, the upper limit is fifty sockets. The upper limit prevents one web server from substantially depleting the total number of sockets available for all web servers. Next, program 60 returns to decision 102 to process the next bundle of files, in the manner described above.

Programs 54, 56 and 60 can be loaded into distributor computer 40 from a computer readable storage media 55 such as magnetic disk or tape, optical disk, DVD, semiconductor memory, etc. or downloaded from the Internet via network I/O device 52.

Based on the foregoing, system, method and program product have been disclosed for transmitting web pages and files to different storages in a substantially consistent manner. However, numerous modifications and substitutions can be made without deviating from the scope of the present invention. For example, the distributor computer 60 can distribute the new files to other distributor computers, local to respective web servers 12a, b, c, in the same manner described above for distribution directly to the web servers 12a, b, c. Also, the file transfer rate to each end point computer/web server can be determined by the distributor computer pinging each end point computer/web server and measuring the time to receive the acknowledgment from each end point computer/web server. Therefore, the present invention has been disclosed by way of illustration and not limitation, and reference should be made to the following claims to determine the scope of the present invention.

What is claimed:

1. A method for transferring files from a first computer to a second computer and from said first computer to a third computer, said method comprising the steps of:

said first computer determining a first measure of file transfer rate per socket from said first computer to said second computer and a second measure of file transfer rate per socket from said first computer to said third computer;

based on the step of determining said first measure of file transfer rate and said second measure of file transfer rate, said first computer determining a first number of sockets within said first computer to actively transfer said files to said second computer and a second number of sockets within said first computer to actively transfer said files to said third computer concurrent with said active transfer of said files to said second computer to equalize, to an extent permitted by a total number of sockets available from said first computer to concurrently and actively transfer said files to said second and third computers, the time required to concurrently and actively transfer said files from said first computer to said second and third computers; and said first computer concurrently and actively (a) transferring said files to said second computer using said first number of sockets, and (b) transferring said files to said third computer using said second number of sockets, wherein said first number of sockets is different than said second number of sockets.

2. The method set forth in claim 1 wherein said first computer has a lesser measure of file transfer rate per socket to said second computer than to said third computer, and in response, said first computer determines said first number of sockets to be greater than said second number of sockets.

3. The method set forth in claim 1 wherein the step of said first computer determining said first measure of file transfer rate from said first computer to said second computer comprises the step of said first computer determining a time for said first computer to transfer a first file to said second computer; and the step of said first computer determining said second measure of file transfer rate from said first computer to said third computer comprises the step of said first computer determining a time for said first computer to transfer a second file to said third computer.

4. The method set forth in claim 1 wherein the step of said first computer determining said first measure of file transfer rate from said first computer to said second computer comprises the step of said first computer pinging said second computer and measuring a time to receive an acknowledgments to the ping of said second computer; and the step of said first computer determining said second measure of file transfer rate from said first computer to said third computer comprises the step of said first computer pinging said third computer and measuring a time to receive an acknowledgment to the ping of said third computer.

5. The method set forth in claim 1 wherein said files transferred from said first computer to said second computer are substantially the same as said files transferred from said first computer to said third computer.

6. The method set forth in claim 1 wherein:

the step of said first computer determining said first measure of file transfer rate from said first computer to said second computers comprises the step of said first computer determining an average bundle transmission time from said first computer to said second computer; and the step of said first computer determining said second measure of file transfer rate from said first computer to said third computer comprises the step of said first computer determining an average bundle transmission time from said first computer to said third computer.

7. The method set forth in claim 1 wherein said first number of sockets is greater than one, and said second number of sockets is greater than one.

8. A first computer for transferring files to a second computer and to a third computer, said first computer comprising:

a CPU, a computer readable memory and a computer readable storage media;

first program instructions to determine a first measure of file transfer rate per socket from said first computer to said second computer and a second measure of file transfer rate per socket from said first computer to said third computer;

second program instructions to determine, based on said first measure of file transfer rate and said second measure of file transfer rate, a first number of sockets within said first computer to actively transfer said files to said second computer and a second number of sockets within said first computer to actively transfer said files to said third computer concurrent with said active transfer of said files to said second computer to equalize, to an extent permitted by a total number of sockets available from said first computer to concurrently and actively transfer said files to said second and third computers, the time required to concurrently and actively transfer said files from said first computer to said second and third computers; and third program instructions to initiate concurrent and active (a) transfer of said files to said second computer using said first number of sockets, and (b) transfer of said files to said third computer using said second number of sockets, wherein said first number of sockets is different than said second number of sockets; and wherein said first, second and third program instructions are stored on said computer readable storage media for execution by said CPU via said computer readable memory.

9. The system set forth in claim 8 wherein said first computer has a lesser measure of file transfer rate per socket to said second computer than to said third computer, and in response, said first second program instructions determine said first number of sockets to be greater than said second number of sockets.

10. The system set forth in claim 8 wherein said first program instructions determine said first measure of file transfer rate from said first computer to said second computer by determining a time for said first computer to transfer a first file to said second computer; and said first program instructions determine said second measure of file transfer rate from said first computer to said third computer by determining a time for said first computer to transfer a second file to said third computer.

11. The system set forth in claim 8 wherein said first program instructions determine said first measure of file transfer rate from said first computer to said second computer by initiating pinging from said first computer to said second computer and measuring a time to receive an acknowledgments to the ping of said second computer; and said first program instructions determine said second measure of file transfer rate from said first computer to said third computer by initiating pinging from said first computer to said third computer and measuring a time to receive an acknowledgment to the ping of said third computer.

12. The system set forth in claim 8 wherein said files transferred to said first computer are substantially the same as said files transferred from said first computer to said third computer.

13. The system set forth in claim 8 wherein:
said first program instructions determine said first measure of file transfer rate from said first computer to said second computers by determining an average bundle transmission time from said first computer to said second computer; and
said first program instructions determine said second measure of file transfer rate from said first computer to said third computer by determining an average bundle transmission time from said first computer to said third computer.

14. The system set forth in claim 8 wherein said first number of sockets is greater than one, and said second number of sockets is greater than one.

15. A computer program product for controlling transfer of files from a first computer to a second computer, said computer program product comprising: a computer readable tangible storage device;
first program instructions to determine a first measure of file transfer rate per socket from said first computer to said second computer and a second measure of file transfer rate per socket from said first computer to said third computer;
second program instructions to determine, based on said first measure of file transfer rate and said second measure of file transfer rate, a first number of sockets within said first computer to actively transfer said files to said second computer and a second number of sockets within said first computer to actively transfer said files to said third computer concurrent with said active transfer of said files to said second computer to equalize, to an extent permitted by a total number of sockets available from said first computer to concurrently and actively transfer said files to said second and third computers, the time required to concurrently and actively transfer said files from said first computer to said second and third computers; and
third program instructions to initiate concurrent and active (a) transfer of said files to said second computer using said first number of sockets, and (b) transfer of said files to said third computer using said second number of sockets, wherein said first number of sockets is different than said second number of sockets; and wherein
said first, second and third program instructions are stored on said computer readable storage media for execution in said first computer.

16. The computer program product set forth in claim 15 wherein said first computer has a lesser measure of file transfer rate per socket to said second computer than to said third computer, and in response, said first second program instructions determine said first number of sockets to be greater than said second number of sockets.

17. The computer program product set forth in claim 15 wherein said first program instructions determine said first measure of file transfer rate from said first computer to said second computer by determining a time for said first computer to transfer a first file to said second computer; and said first program instructions determine said second measure of file transfer rate from said first computer to said third computer by determining a time for said first computer to transfer a second file to said third computer.

18. The computer program product set forth in claim 15 wherein said first program instructions determine said first measure of file transfer rate from said first computer to said second computer by initiating pinging from said first computer to said second computer and measuring a time to receive an acknowledgments to the ping of said second computer; and said first program instructions determine said second measure of file transfer rate from said first computer to said third computer by initiating pinging from said first computer to said third computer and measuring a time to receive an acknowledgment to the ping of said third computer.

19. The computer program product set forth in claim 15 wherein said files transferred to said first computer are substantially the same as said files transferred from said first computer to said third computer.

20. The computer program product set forth in claim 15 wherein:
said first program instructions determine said first measure of file transfer rate from said first computer to said second computers by determining an average bundle transmission time from said first computer to said second computer; and
said first program instructions determine said second measure of file transfer rate from said first computer to said third computer by determining an average bundle transmission time from said first computer to said third computer.

21. The computer program product set forth in claim 15 wherein said first number of sockets is greater than one, and said second number of sockets is greater than one.

* * * * *